United States Patent
Geiger

(10) Patent No.: US 7,624,217 B2
(45) Date of Patent: Nov. 24, 2009

(54) ADAPTIVE BOOT SEQUENCE

(75) Inventor: Avi R. Geiger, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 205 days.

(21) Appl. No.: 11/705,207

(22) Filed: Feb. 12, 2007

(65) Prior Publication Data

US 2008/0195787 A1    Aug. 14, 2008

(51) Int. Cl.
*G06F 9/00* (2006.01)
(52) U.S. Cl. .......................................... 710/301; 713/2
(58) Field of Classification Search ......... 710/301–304; 713/300–340, 1–2
See application file for complete search history.

(56) References Cited

U.S. PATENT DOCUMENTS

| | | | | |
|---|---|---|---|---|
| 5,097,249 A | * | 3/1992 | Yamamoto | 340/538.17 |
| 5,224,010 A | * | 6/1993 | Tran et al. | 361/90 |
| 5,301,334 A | * | 4/1994 | Horiuchi | 713/330 |
| 5,396,635 A | * | 3/1995 | Fung | 713/323 |
| 5,463,261 A | * | 10/1995 | Skarda et al. | 307/131 |
| 5,483,656 A | * | 1/1996 | Oprescu et al. | 713/320 |
| 5,568,610 A | * | 10/1996 | Brown | 714/48 |
| 5,629,870 A | * | 5/1997 | Farag et al. | 700/286 |
| 5,812,796 A | * | 9/1998 | Broedner et al. | 710/302 |
| 5,862,349 A | * | 1/1999 | Cho et al. | 710/304 |
| 5,898,861 A | * | 4/1999 | Emerson et al. | 703/23 |
| 5,943,482 A | * | 8/1999 | Culley et al. | 710/302 |
| 6,032,209 A | * | 2/2000 | Mros et al. | 710/302 |
| 6,061,745 A | | 5/2000 | Mahmoud | |
| 6,062,480 A | * | 5/2000 | Evoy | 235/492 |
| 6,125,417 A | * | 9/2000 | Bailis et al. | 710/302 |
| 6,170,029 B1 | * | 1/2001 | Kelley et al. | 710/302 |
| 6,216,226 B1 | | 4/2001 | Agha et al. | |
| 6,241,400 B1 | | 6/2001 | Melo et al. | |
| 6,275,882 B1 | * | 8/2001 | Cheever et al. | 710/302 |
| 6,459,175 B1 | * | 10/2002 | Potega | 307/149 |
| 6,642,852 B2 | * | 11/2003 | Dresti et al. | 340/825.72 |
| 6,668,296 B1 | * | 12/2003 | Dougherty et al. | 710/303 |
| 6,754,817 B2 | * | 6/2004 | Khatri et al. | 713/1 |
| 6,874,093 B2 | * | 3/2005 | Bell | 713/300 |
| 6,883,091 B2 | | 4/2005 | Morrison et al. | |
| 6,928,561 B2 | * | 8/2005 | Farkas et al. | 713/300 |
| 6,973,535 B2 | * | 12/2005 | Bruner et al. | 711/112 |
| 7,000,249 B2 | | 2/2006 | Lee | |
| 7,002,265 B2 | * | 2/2006 | Potega | 307/149 |
| 7,010,723 B2 | | 3/2006 | Pelner | |
| 7,039,821 B1 | * | 5/2006 | Potega | 713/340 |

(Continued)

OTHER PUBLICATIONS

Itoi, et al., "Personal Secure Booting", Date: May 14, 2001, http://scholar.google.com/scholar?hl=en&lr=&q=power+signature+for+booting&btnG=Search.

(Continued)

*Primary Examiner*—Paul R Myers

(57) ABSTRACT

An interface to a removable device includes a power monitoring device that can be used to quickly detect if a removable device is present during boot up or start. If the removable device is present, the normal startup sequence is performed for the removable device. If the removable device is not present, the startup sequence skips any further startup sequence for the removable device. In some embodiments, the power draw of a device may be used to detect that the removable device is ready, rather than waiting a predetermined time before assuming that the removable device is ready.

19 Claims, 3 Drawing Sheets

U.S. PATENT DOCUMENTS

| | | | |
|---|---|---|---|
| 7,055,025 B2 | 5/2006 | Chen | |
| 7,062,645 B2 | 6/2006 | Kroening | |
| 7,103,695 B2 * | 9/2006 | Peil et al. | 710/301 |
| 7,216,191 B2 * | 5/2007 | Sagues et al. | 710/301 |
| 7,240,224 B1 * | 7/2007 | Biederman | 713/300 |
| 2004/0088465 A1 * | 5/2004 | Bianchi | 710/303 |
| 2004/0260794 A1 * | 12/2004 | Ferentz et al. | 709/220 |
| 2005/0289336 A1 | 12/2005 | Chen et al. | |
| 2006/0064571 A1 | 3/2006 | Tseng | |
| 2006/0205413 A1 * | 9/2006 | Teague | 455/452.1 |
| 2007/0103829 A1 * | 5/2007 | Darshan et al. | 361/90 |
| 2007/0121172 A1 * | 5/2007 | Hamada | 358/419 |
| 2007/0271475 A1 * | 11/2007 | Hatasaki et al. | 713/324 |
| 2008/0126814 A1 * | 5/2008 | Burkland et al. | 713/300 |
| 2008/0276111 A1 * | 11/2008 | Jacoby et al. | 713/340 |

OTHER PUBLICATIONS

Shuanghe, et al., "Enhancing PC Security with a U-Key", Date: 2006, http://ieeexplore.ieee.org/iel5/8013/35970/01704779.pdf?isNumber=.

* cited by examiner

ADAPTIVE BOOT SEQUENCE

BACKGROUND

Many electronic devices have various interfaces and busses that allow removable devices, cards, and subsystems to be added or removed. As the devices increase in complexity and have several such interfaces, the time required to boot up or start the device increases. In many cases, an interface may need to have power applied and, after a period of time, the interface may be queried to determine if a removable device is present. When several such interfaces are present, the time required to boot up or start a device can be frustratingly long.

SUMMARY

An interface to a removable device includes a power monitoring device that can be used to quickly detect if a removable device is present during boot up or start. If the removable device is present, the normal startup sequence is performed for the removable device. If the removable device is not present, the startup sequence skips any further startup sequence for the removable device. In some embodiments, the power draw of a device may be used to detect that the removable device is ready, rather than waiting a predetermined time before assuming that the removable device is ready.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
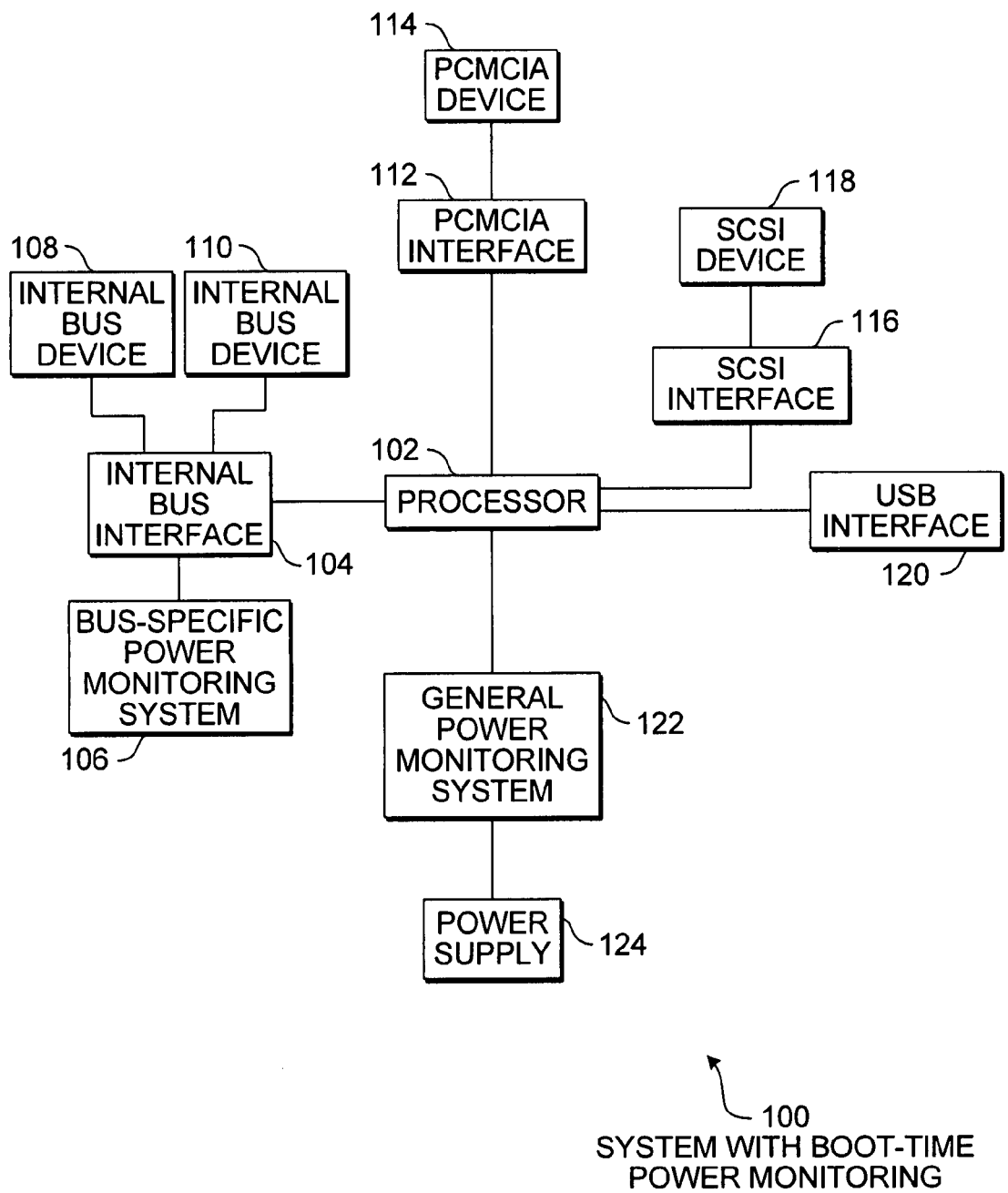
FIG. 1 is a diagram illustration of an embodiment showing a system with boot-time power monitoring.

During a boot sequence for a system, each bus connected to the system performs a startup sequence for devices attached to the bus. When a bus device is not present, the bus startup sequence detects that there is no power draw on the bus and thus can jump to the next action in the boot sequence.

The power detection may be applied to any bus that has removable components, whether they be user-removable or not. Some bus components may be internal to a system and known as internal busses. An example may include peripheral component interconnect ('PCI'), PCI Express, SCSI, or ATA. Other bus components may be external busses, examples of which include PCMCIA, universal serial bus ('USB'), and IEEE-488.

The detection of a device on a bus is performed by monitoring power draw of the bus during a boot sequence. The amount of power and the signature of the power draw may be used to determine if a device is present, and in some cases determine what type of device is present and if the device has come to a ready state.

Power may be detected through any appropriate mechanism. In a simple embodiment, a simple comparator may be used to indicate a device presence, while in other embodiments, analog to digital converters may be used to sample the power draw into a form that may be analyzed.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with boot-time power monitoring. A processor 102 is connected to an internal bus interface 104 that has a bus-specific power monitoring system 106 and internal bus devices 108 and 110. Processor 102 is connected to a PCMCIA interface 112 which is connected to a PCMCIA device 114. Similarly, the processor 102 is connected to a SCSI interface 116 that is connected to a SCSI device 118. The processor 102 is connected to a Universal Serial Bus ('USB') interface 120 to which no devices are attached. The processor 102 is connected to a general power monitoring system 122 which is connected to a system power supply 124.

Embodiment 100 is an example of a system that may use power monitoring to determine if a device is present on one or more interfaces. When a device is not present during a boot sequence, that portion of the boot sequence may be shortened without having to wait for a timeout sequence to occur.

A device on an interface may be detected when power is applied to the bus and power is drawn by the device. In many cases, a device may take an initial high current power draw and settle to a lower power draw after the device comes to a ready state. In some instances, a device may have a particular power draw signature that may be used to determine the type of device that is attached to the interface and in which state the device is operating.

During a boot sequence, one mechanism for determining if a device is present is to apply power, wait a specific period of time, and send a query over the interface to determine if a device is present. The period of time is generally selected so that any device connected to the interface may have adequate time to initialize, perform any power on sequences, and come to a ready state in order to communicate on the interface. The period of time may be drastically shortened by checking to see if an initial power draw occurs when power is applied. If a relatively high power draw does not occur, it can be assumed that no devices are present.

Similarly, when a device is detected, a boot sequence may be shortened by detecting that the attached device has to come to a ready state by analyzing a power draw signature. The processor may begin communication with the attached device immediately when the device is ready rather than waiting a predetermined time for any devices on the bus that have already come to a ready state.

In some embodiments, after detecting that a device is present, the boot sequence may perform a waiting period before querying any devices on an interface. Many bus specifications have a predefined waiting period for a boot up sequence. The waiting period is sometimes set by a standards body and compliant devices attached to the bus will come to a ready state no later than the waiting period. In many cases, a device may be ready long before the waiting period expires.

A simple embodiment of a power monitoring device may include a comparator that indicates the power draw is greater than a predetermined value. Such an embodiment has an advantage of being low cost and relatively simple to implement.

In more complex embodiments, an analog to digital converter may be employed to sample the power draw over a period of time. Such an embodiment may be able to determine a power draw signature of any device attached to an interface. A power draw signature may be used to resolve a specific device type and, in some cases, a specific state for the attached device.

Power monitoring may be performed by power monitoring systems that operate on a bus level, such as the bus specific power monitoring system 106 or at as general power monitoring system 122. The general power monitoring system 122 may be able to detect and measure power draw across an entire system, and may be able to distinguish which interface is drawing power in some instances. For example, a system-wide power level may be measured before a bus is initialized and shortly thereafter. If a large power increase is detected between the two measurements, it may be assumed that the bus initialization caused the power change and thus a device is present on the bus. If the difference is below a threshold value, it may be assumed that no device is present. Such a system may have less accuracy than a bus-specific power monitoring system 106, as other components or devices within the system 100 may adversely affect a reading.

When a bus-level power monitoring system is employed, the power being drawn by devices attached directly to the bus may be sensed in a more accurate manner than when using a general power monitoring system 122.

A bus-level power monitoring system may be employed during the operation of an interface to determine a status of devices on an interface. An example of such a status may include detecting that a device attached to an interface is drawing sufficient power to charge a battery attached to the device.

A general power monitoring system 122 may be sufficient to determine the presence of a device attached to an interface in certain circumstances. For example, when the overall power draw for the system 300 is stable and the processor 302 performs an instruction to apply power to one of the various interfaces, the general power monitoring system 122 may be able to sense a power spike that would indicate a device is present on the interface that was just enabled.

A power monitoring system may be applied to any type of interface that may have a removable device. In some instances, the removable device may be a user-removable device, such as a USB or PCMICA device. In other instances, the removable device may be a PCI device attached to an internal bus that is not readily user-serviceable. By applying a power monitoring system to as many bus interfaces as possible, a generalized boot sequence may be used that includes routines for many types of interfaces, but the generalized boot sequence may be able to skip past interfaces that are not present or where no devices are attached to the interfaces.

For example, a computer manufacturer may have various internal busses that are used to attach various features to the computer. An example may be an internal card that contains a wireless adapter. When the wireless adapter is present in the system, the boot sequence may apply power, wait for the wireless adapter to become ready, and communicate with the wireless adapter. When the wireless adapter is not present, the boot sequence may skip the interface with the wireless adapter after detecting that no device is present. By using a power monitoring system for the system, the computer manufacturer may deliver various versions of the computers while enabling each version to perform a boot sequence as quickly as possible while using the same hardware and software.

Any type of interface may be monitored using either a bus-specific power monitoring system 106 or a general power monitoring system 122. The interfaces may be internal or external, serial or parallel, standardized or proprietary, and be of any design imaginable. In some instances, a single physical connector may connect data and power between the interface and a connected device, while in other instances, data and power may be separated into two or more different physical connections. The power connection may be a typical hard-wired connection or may comprise a capacitive, inductive, or any other type of coupling that may conduct power from the interface to the connected device.

In some instances, a power monitoring system may be capable of detecting the number of devices attached to an interface. When power is applied, power draw analysis may indicate that two or more devices are attached. When multiple devices are sensed, a boot sequence may ensure that each of the individual devices are present and operational.

A power monitoring system may be used for other functions, including verification that certain devices are present in a system. Such information may be used by a security system, for example, to verify that the system is configured in a specific manner and that improper devices have not been added or other devices improperly removed.

The processor 102 may be any type of processor unit, including a general purpose programmable processor, a gate array, state machine, or other type of logic device. In many embodiments, memory devices may be used to store and retrieve processor instructions and data. The processor 102 may have operator interfaces, network interfaces, or other interfaces as appropriate. A typical embodiment may beta personal computer such as a desktop workstation or a portable laptop or notebook computer.

Figure 2:
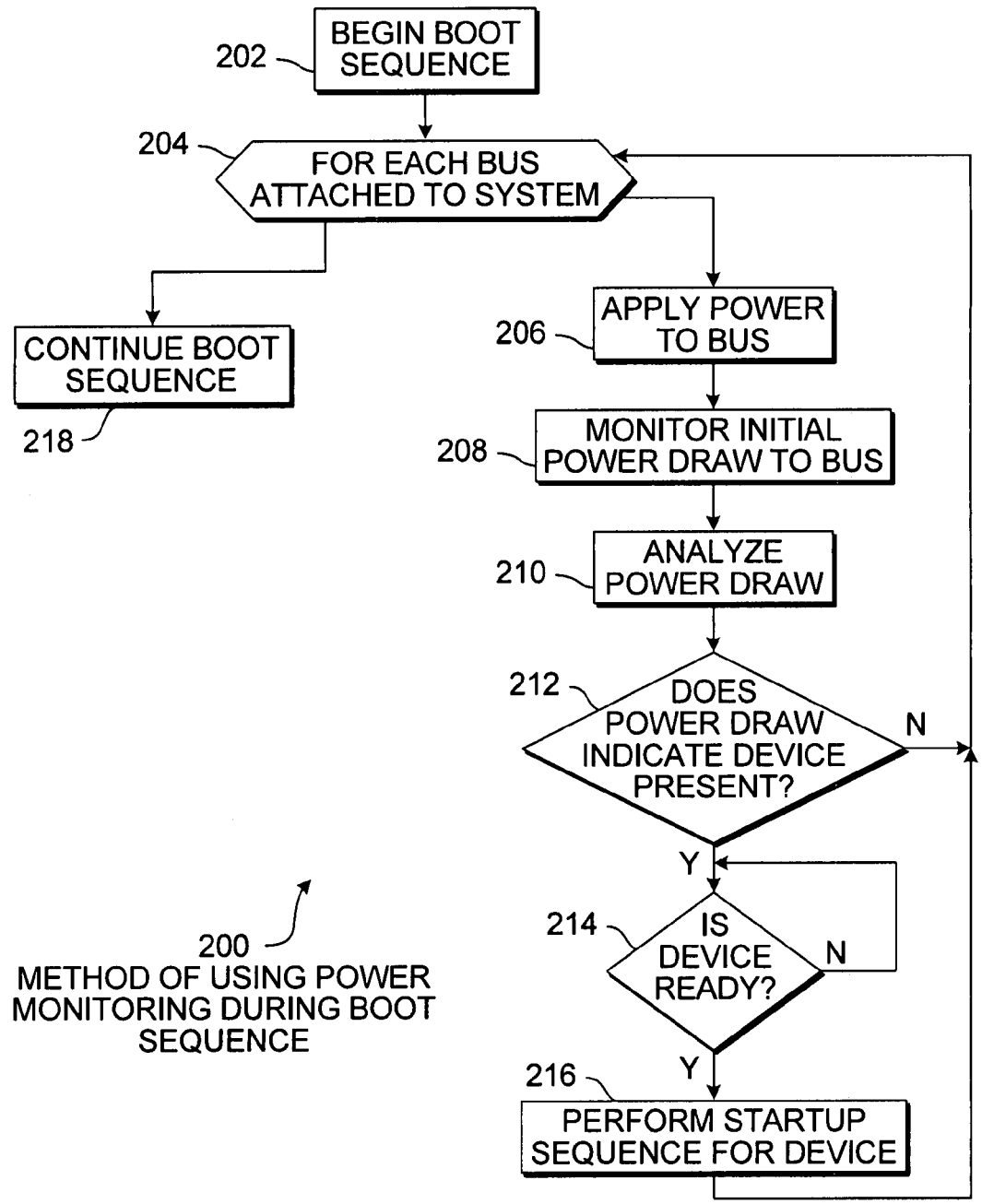
FIG. 2 is a flowchart illustration of an embodiment showing a method for analyzing the power draw of a bus device and shortening a boot sequence if the device is not present.

FIG. 2 is a flowchart illustration of an embodiment 200 showing a method for using power monitoring during a boot sequence. A boot sequence is begun in block 202. For each bus attached to a system in block 204, the following sequence may be performed.

Power is applied to the bus in block 206 and the initial power draw is monitored in block 208. The initial power draw is analyzed in block 210 and if the power draw does not indicate that a device is present in block 212, the sequence returns to block 204. If the power draw does indicate that a device is present in block 212, the sequence may wait until the device is ready in block 214 then perform a startup sequence for the device in block 216. After the startup sequence is performed in block 216, the sequence returns to block 204. After each bus has been initialized in block 204, the boot sequence continues in block 218.

Embodiment 200 is an illustration of a boot sequence that uses power measurement to determine if a device is present. When power is applied to a bus and a device is not detected, a boot sequence may skip further activity with the bus. When a device is present, the normal boot sequence for the device is performed.

In some embodiments, a boot sequence may perform a power on operation for each bus system individually and in sequence. Such an embodiment may be used when a system-wide power monitoring system is used so that devices attached to a specific bus may be detected. In embodiments where bus-specific power monitoring systems are used, busses may be powered on simultaneously and attached devices may be resolved for each specific bus.

The analysis of power draw in block 210 may be any type of analysis that may be used to determine that a device is present on an interface. A simple monitoring system may use a hardware comparator to determine that a device is either present or not present. Such a system may be implemented in hardware and return a binary output.

In a more complex monitoring system, waveform signatures of the power draw may be analyzed in block 210. Such analysis may comprise comparing the monitored waveform with various parameters or matching the monitored waveform with other waveform signatures to determine presence as well as other parameters about the attached device. Other parameters may include a device type, a device status, or any other parameter.

A device may be considered ready in block 214 using various methods. In some embodiments, a timer may be used to wait a predetermined amount of time before performing a startup sequence of block 216. In other embodiments, a timer may be used in conjunction with monitoring various signals that an attached device may send over an interface when the device is ready. If the device does not indicate that it is ready within the time period determined by the timer, the device may have an error. In still other embodiments, a power monitoring system may determine that a device is ready by monitoring a waveform of power draw. In yet other embodiments, combinations of timers, power monitoring system output, signal monitoring, or other mechanisms may be used to determine that a device is ready in block 214.

Figure 3:
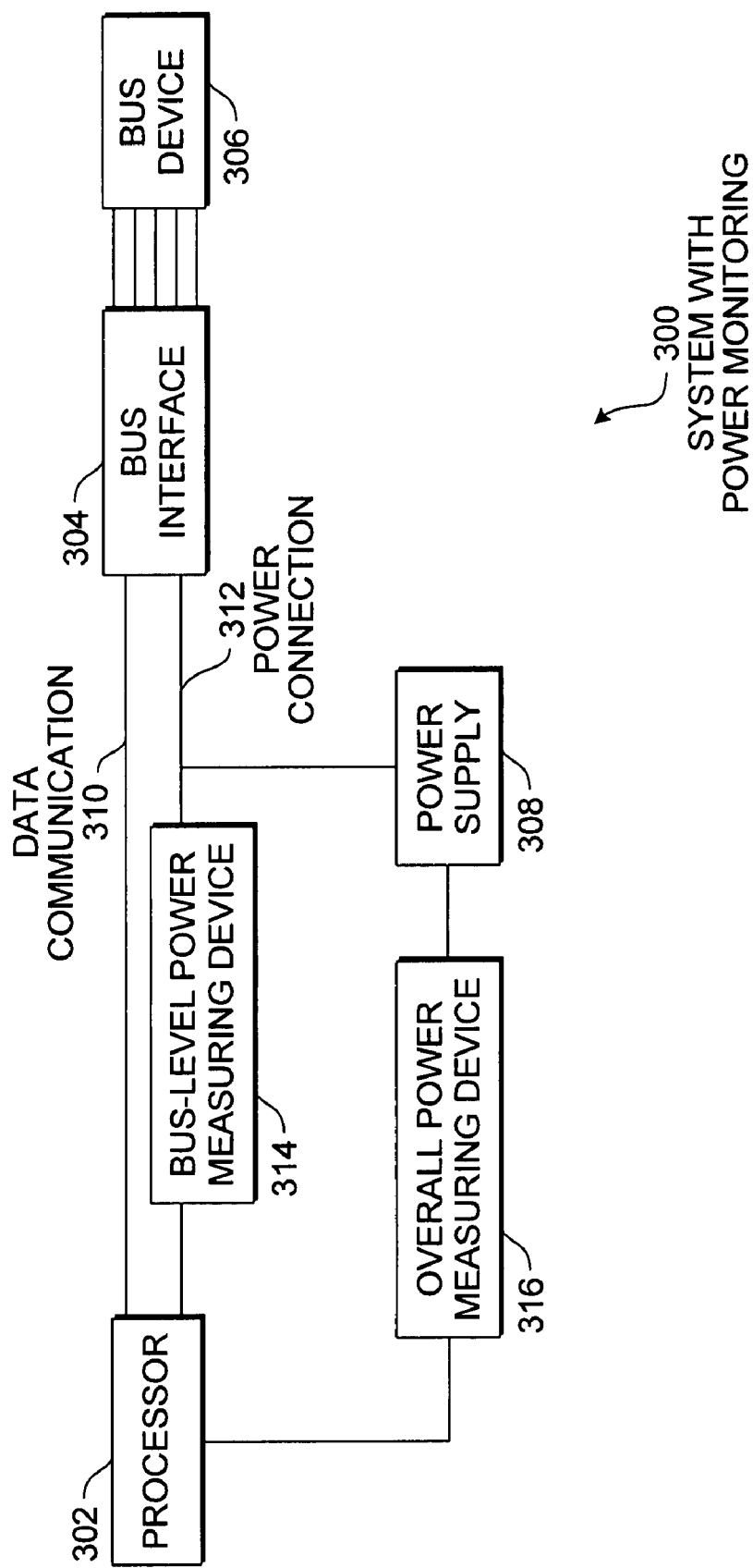
FIG. 3 is a diagram illustration of an embodiment showing a system with both a bus-level power measuring device and an overall power measuring device.

FIG. 3 is a diagram illustration of an embodiment 300 showing a system with power monitoring. A processor 302 is connected to a bus interface 304 that is connected to a bus device 306. The bus interface 304 is also connected to a power supply 308. The processor 302 may send data communication 310 to the bus interface 304 that may be communicated to the bus device 306. The power supply 308 may make a power connection 312 to the bus interface 304. A bus-level power measuring device 314 may monitor to power connection 312 and provide data input to the processor 302. An overall power monitoring device 316 may monitor the power output of the power supply 308 and provide data input to the processor 302.

Embodiment 300 illustrates a system that has two power measuring devices: a bus-level power measuring device 314 and an overall power measuring device 316. Some embodiments may contain either or both of the two power measuring devices 314 and 316. The power measuring devices 314 and 316 may sense the power flowing to the bus interface 304 and, based on the amount of power flowing to the bus interface 304, determine if the bus device 306 is present or not.

The power measurement devices 314 and 316 may be a discrete hardware device, such as a comparator circuit that may have a digital output, or may be a more complex device that contains various analog, digital, and analog to digital circuitry. A more complex device may incorporate firmware, software, logic arrays, gate arrays, or other logic in order to analyze the power connection 312 and return a determination of whether the bus device 306 is present. In some embodiments, the processor 302 may perform at least some of the analysis, while in other embodiments, one or both of the power measuring devices 314 and 316 may perform the analysis.

In some embodiments, the overall power measuring device 316 may be an output of a system power supply 308, while in other embodiments, the power measuring devices 314 and 316 may be separate circuits or devices from the power supply 308 or other components of the system.

Boot sequences may be shortened by determining the presence of the bus device 306 through the power draw of the bus device 306. When the bus device 306 is not present, the boot sequence may skip the portion of the boot sequence that may be devoted to the bus interface 304 and any devices attached thereto.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
   a bus for attaching at least one removable device;
   a power measurement device adapted to measure power applied to said bus; and
   a controller adapted to perform a boot sequence comprising:
   applying power to said bus;
   measuring a first power draw using said power measurement device;
   if said first power draw is greater than a predetermined limit, determining that said at least one removable device is present; and
   if said first power draw is less than a predetermined limit, determining that said at least one removable device is not present,
   said controller being further adapted to determine in which of at least three states said at least one removable device is operating using a power draw signature.

2. The system of claim 1, said power measurement device being further adapted to determine that said first power draw has stabilized.

3. The system of claim 1, said power measurement device comprising a hardware component.

4. The system of claim 3, said hardware component comprising an analog to digital converter.

5. The system of claim 3, said hardware component comprising a comparator.

6. The system of claim 1, said controller being further adapted to determine a device type from said first power draw.

7. The system of claim 1, said controller being further adapted to detect that said at least one removable device has come to a ready state.

8. The system of claim 1, said controller being further adapted to waiting for a predetermined time for said at least one removable device to come to a ready state.

9. The system of claim 1 further comprising a power supply, wherein said power management device being adapted to measure an overall power draw from said power supply.

10. The system of claim 1, said bus being a version or derivative of one of a group composed of PCMCIA bus, universal serial bus, and peripheral component interconnect bus.

11. A method comprising:
    beginning a boot sequence;
    applying power to an interface, said interface being adapted to connect to at least one removable device;
    measuring said power to said interface to determine a power draw;
    if said power draw is greater than a predetermined limit, determining that said at least one removable device is present and waiting for said at least one removable device to come to a ready state;
    if said power draw is less than a predetermined limit, determining that said at least one removable device is not present and advancing to another step in said boot sequence; and
    determining a device type from said power draw of said at least one removable device and in which of a not present state, a present but not ready state or a ready state said at least one removable device is operating using a power draw signature.

12. The method of claim 11, said power measurement device being further adapted to determine that said power draw has stabilized.

13. The method of claim 11, said power measurement device comprising a hardware component.

14. The method of claim 11, said waiting for at least one removable device to come to a ready state comprises analyzing said power draw.

15. The method of claim 11, said waiting for at least one removable device to come to a ready state comprises waiting a predetermined time.

16. The method of claim 11 being a personal computer device.

17. The method of claim 11, said interface being a version or derivative of one of a group composed of PCMCIA bus, universal serial bus, and peripheral component interconnect bus.

18. A computer readable medium comprising computer readable instructions adapted to perform the method of claim 11.

19. An interface comprising:
    a connector adapted to connect to a removable device;
    a power measurement device adapted to measure power to said removable device;
    a controller adapted to:
    apply said power to said removable device;
    determine if said removable device is present by analyzing said power using said power measurement device;
    indicate that said removable device is present during a boot sequence based on said analyzing said power;
    determine a type of said removable device based on a power draw signature using said power management device; and
    detect that said removable device has come to a ready state by analyzing the power draw signature.

* * * * *